United States Patent
De Coninck et al.

(10) Patent No.: US 9,867,324 B2
(45) Date of Patent: Jan. 16, 2018

(54) HEADER MOUNTING FRAME

(71) Applicant: CNH Industrial America LLC, New Holland, PA (US)

(72) Inventors: Willem De Coninck, Ninove (BE); Frank R. G. Duquesne, Zwevegem (BE)

(73) Assignee: CNH Industrial America LLC, New Holland, PA (US)

( * ) Notice: Subject to any disclaimer, the term of this patent is extended or adjusted under 35 U.S.C. 154(b) by 0 days.

(21) Appl. No.: 15/079,744

(22) Filed: Mar. 24, 2016

(65) Prior Publication Data
US 2016/0278276 A1    Sep. 29, 2016

(30) Foreign Application Priority Data
Mar. 27, 2015   (BE) .................... 2015/5194

(51) Int. Cl.
*A01D 34/00* (2006.01)
*A01B 63/00* (2006.01)
*A01D 75/28* (2006.01)

(52) U.S. Cl.
CPC .......... *A01B 63/004* (2013.01); *A01D 34/008* (2013.01); *A01D 75/287* (2013.01)

(58) Field of Classification Search
CPC .... A01D 41/16; A01D 41/145; A01D 41/141; A01D 41/06; A01D 75/287
USPC .......................................................... 56/208
See application file for complete search history.

(56) References Cited

U.S. PATENT DOCUMENTS

| | | | | |
|---|---|---|---|---|
| 3,731,470 A | * | 5/1973 | Cornish | A01D 75/285 280/124.128 |
| 4,266,392 A | * | 5/1981 | Knepper | A01D 41/14 56/14.5 |
| 5,415,586 A | * | 5/1995 | Hanson | A01D 75/287 180/41 |
| 5,918,448 A | * | 7/1999 | Wheeler | A01D 75/287 56/10.2 E |
| 6,510,680 B2 | * | 1/2003 | Uhlending | A01D 75/287 56/10.2 E |
| 6,735,929 B2 | * | 5/2004 | Watts | A01D 41/16 56/14.9 |
| 6,813,873 B2 | | 11/2004 | Allworden et al. | |

(Continued)

FOREIGN PATENT DOCUMENTS

| CA | 2624556 A1 | 9/2008 |
|---|---|---|
| DE | 4223026 A1 | 1/1994 |
| DE | 4223826 A1 | 1/1994 |

*Primary Examiner* — Arpad Fabian-Kovacs
(74) *Attorney, Agent, or Firm* — Patrick M. Sheldrake; Peter K. Zacharias

(57) ABSTRACT

An agricultural harvester including a feeder. The feeder is pivotally mounted to an intermediate frame with respect to a first axis of motion. The intermediate frame is pivotally mounted to a header mounting frame with respect to a second axis of motion. Pivoting around the first axis of motion and the second axis of motion allows a fore-aft movement and a lateral tilt movement. At least one lateral tilt actuator is provided to actuate the header mounting frame in the lateral tilt movement. At least two fore-aft actuators are provided for extending between a first set of mounting positions at the feeder and a second set of mounting positions at the header mounting frame to actuate the header mounting frame in the fore-aft movement.

13 Claims, 2 Drawing Sheets

(56) References Cited

U.S. PATENT DOCUMENTS

| | | |
|---|---|---|
| 7,191,582 B2 | 3/2007 | Bomleny |
| 7,207,164 B2 | 4/2007 | Bomleny |
| 7,222,475 B2 * | 5/2007 | Bomleny ............. A01D 41/141 56/10.2 E |
| 7,430,846 B2 * | 10/2008 | Bomleny ............. A01D 41/141 56/10.2 E |
| 8,079,204 B2 | 12/2011 | Coers et al. |
| 8,826,635 B2 * | 9/2014 | Schraeder ........... A01D 41/145 56/10.2 E |
| 9,137,946 B2 * | 9/2015 | Verhaeghe ............. A01D 41/16 |
| 9,309,057 B2 * | 4/2016 | Juelke .................. A01D 41/16 |
| 2016/0183461 A1 * | 6/2016 | Neudorf ................ A01D 41/14 56/158 |

* cited by examiner

HEADER MOUNTING FRAME

CROSS REFERENCE TO RELATED APPLICATION

This application claims priority to Belgium Application BE2015/5194 filed Mar. 27, 2015, which is incorporated herein by reference in its entirety.

FIELD OF THE INVENTION

The present invention relates to an agricultural harvester comprising a feeder and a header mounting frame, which is movably connected to the feeder.

BACKGROUND OF THE INVENTION

An agricultural harvester, in operation, carries a header for cutting crop material and transporting the crop material to the feeder of the agricultural harvester. The header is connected to the header mounting frame of the agricultural harvester. In recent years the dimensions of the header, and particularly the width of the header, has significantly increased so that also the weight of the header is significantly higher today. The width of the header requires the header mounting frame to be pivotally mounted to the feeder, directly or indirectly, to allow a lateral tilt movement of the header mounting frame with respect to the feeder. This lateral tilt movement is actuated by at least one lateral tilt actuator so that lateral tilt of the header can be automatically adjusted while operating the agricultural harvester. Such lateral tilt movement prevents the end segments of the header from touching the ground surface when the ground surface is uneven.

EP 2 172 095 describes a further evolution of an agricultural harvester, wherein the header mounting frame is not only able to automatically rotate in a lateral tilt movement, but is also able to automatically move in a fore-aft movement. Tests have shown that an ideal angle between the ground surface and the header cutting elements provided at the leading edge of the header depends on multiple parameters, for example the type of crop material to be harvested. EP 2 172 095 describes a feeder which is pivotally connected to an intermediate frame, so that the intermediate frame can rotate around an axis that is substantially horizontal and transverse to the forward driving direction of the agricultural harvester, and wherein a fore-aft actuator is provided which extends between the intermediate frame and the feeder to actuate a rotation of the intermediate frame with respect to the feeder. Furthermore, the intermediate frame is pivotally connected to the header mounting frame to enable a rotation of the header mounting frame with respect to the intermediate frame around an axis that is substantially horizontal and parallel to a forward driving direction of the agricultural harvester, and wherein a lateral tilt actuator is provided between the intermediate frame and the header mounting frame to actuate rotation of the header mounting frame with respect to the intermediate frame, thereby actuating the lateral tilt movement of the header. A major advantage of such set-up is that both the lateral tilt movement and the fore-aft movement can be automatically adjusted via respective actuators, so that an optimal position of the header can be obtained by steering the lateral tilt actuator and the fore-aft actuator into their respective optimal positions. This significantly facilitates the use of the agricultural harvester for an operator since the operator is able to remotely adjust the fore-aft position of the header as well as the lateral tilt position of the header.

A draw-back of the known system is that due to the increase in width and weight of the header of the past years, the tension and forces on the connection points between feeder and intermediate frame and between intermediate frame and header mounting frame, during normal operation of the harvester, are so high that any unexpected impact on the header can result in damage or breaking of these connection points. Recent tests have illustrated this, when an agricultural harvester literally drove over a header which broke off from the harvester when the connection between the intermediate frame and a header mounting frame was overloaded.

It is an object of the present invention to provide an agricultural harvester wherein the header mounting frame can be automatically adjusted in the fore-aft movement and in the lateral tilt movement, and wherein the header mounting frame is more rigidly connected to the feeder.

SUMMARY OF THE INVENTION

To this end, in accordance with an aspect of the present invention, there is provided an agricultural harvester. The agricultural harvester comprises a feeder, an intermediate frame pivotally mounted to the feeder to facilitate pivoting of the intermediate frame relative to the feeder with respect to a first axis of motion, and a header mounting frame pivotally mounted to the intermediate frame to facilitate pivoting of the header mounting frame relative to the intermediate frame with respect to a second axis of motion. Pivoting around the first axis of motion and the second axis of motion allows the header mounting frame to be moved with respect to the feeder in a fore-aft movement and a lateral tilt movement. At least one lateral tilt actuator is provided to actuate the header mounting frame in order to perform the lateral tilt movement. At least two fore-aft actuators are provided, each extending between a corresponding one of a first set of mounting positions at the feeder and a second set of mounting positions at the header mounting frame to actuate the header mounting frame in order to perform the fore-aft movement.

In the agricultural harvester, two fore-aft actuators are provided which both extend between the feeder and the header mounting frame. Thereby, the two fore-aft actuators pass the intermediate frame. This creates a direct connection between the feeder and the header mounting frame. This direct connection by two actuators significantly reinforces the header mounting frame support structure since the load of the header and impacts on the header will be divided between on the one hand the connection points between feeder and intermediate frame and between intermediate frame and header mounting frame, and on the other hand the two fore-aft actuators. Tests have shown that the connecting points and the header mounting frame can be formed significantly less strong compared to the prior art system while the risk of breaking of the connection points is less than prior art systems due to the two fore-aft actuators extending between the header mounting frame and the feeder. In this set-up, the load of the header is not only transmitted from header mounting frame to the feeder via the connecting points, but at least a portion of this load is directly transmitted from the header mounting frame via two fore-aft actuators to the feeder so that the connecting points are at least partially relieved. This results in a more rigid connection between header mounting frame and the feeder while allowing an automatic lateral tilt movement and an automatic fore-aft movement.

Desirably, the two fore-aft actuators are cross-coupled such that, in a predetermined fore-aft position of the two actuators, a retraction of one of the actuators results in an extension of the other of the two actuators and vice versa. A cross-coupling of the two fore-aft actuators significantly reduces the impact of a lateral tilt movement on the fore-aft position of the header. Because the two fore-aft actuators are arranged at a horizontal distance from one another, a lateral tilt movement will adversely affect the fore-aft actuators. The cross-coupling of the actuators allows one actuator to retract while the other actuator extends proportional to the retraction, so that the adverse affection of the two fore-aft cylinders is at least partially compensated.

Desirably, the two fore-aft actuators are dimensioned to each have an operating range that is at least 10% larger than the actuator acting range required to enable a maximum fore-aft movement when the lateral tilt actuator is in a predetermined neutral position. Thereby, further desirably, the two fore-aft actuator are arranged in such manner that the actuator acting ranges are substantially in the middle of the operating ranges of the actuators. The advantage of over-dimensioning the two fore-aft actuators is that in at least one of their extreme positions, for example the header tilted in its most forward (fore) or most rearward (aft) position, the two fore-aft cylinders still have some operating room to allow the cross-coupling between the actuators to work when a lateral tilt movement is applied to the header. Thereby, it will be clear that when an actuator is at its most extended or most retracted position, the cross-coupling will not work since further extension or further retraction of the actuator is not possible anymore. Therefore, over-dimensioning the operating range of the fore-aft actuators with respect to the acting range that is required to enable a maximum fore-aft movement in a neutral position of the lateral tilt actuator further improves the header mounting system.

Desirably, the first axis of motion and the second axis of motion extends substantially horizontal with an angle of about 90° between them. When the axis extends substantially horizontal, and show an angle of about 90° between them, the fore-aft movement and lateral tilt movement can be optimally embodied.

Desirably, the fore-aft movement of the header mounting frame is defined as a movement of the header mounting frame with respect to the feeder about a first axis which is substantially horizontal and transverse to the forward driving direction of the agricultural vehicle. Further, desirably, the lateral tilt movement of the header mounting frame is defined as a movement of the header mounting frame with respect to the feeder about an axis which is substantially horizontal and parallel to the forward driving direction of the agricultural vehicle. Thereby, the lateral tilt movement allows the header to be tilted so that a left end of the header and a right end of the header show substantially the same distance to a ground surface. The lateral tilt movement allows to achieve such substantially the same distance even when the ground surface is not flat. The fore-aft movement allows to adjust the angle between the cutting knives, positioned at the leading edge of the header, and the ground surface so that this angle can be optimized depending on predetermined parameters.

Desirably, the header mounting frame comprises a lying support beam comprising the second set of mounting positions. The lying support beam supports the header mounting frame, and desirably gives strength to the header mounting frame. By providing the mounting positions for the two fore-aft actuators to the lying support beam, a strong connection can be obtained between the feeder and the header mounting plate via the two fore-aft actuators and the lying support beam.

Desirably, the lying support beam is located at an upper side of the header mounting frame and wherein the first set of mounting positions is located higher than the second set of mounting positions, such that the two fore-aft actuators carry at least a part of the weight of the header mounting frame. Alternatively, the lying support beam is located at the lower side of the header mounting frame, and wherein the first set of mounting positions is located lower than the second set of mounting positions such that the two fore-aft actuators carry at least a part of the weight of the header mounting frame. According to the first embodiment, the two fore-aft actuators extend upwards from a lying support beam which is positioned at an upper part of the header mounting frame, so that the upwardly extending fore-aft actuators carry at least a part of the weight of the header mounting frame, and at least a part of the weight of the header when the header is mounted to the header mounting frame. In an analogue manner, downwardly extending fore-aft actuators can carry a part of the weight of the header mounting frame so that less weight is to be carried by the connecting points.

Desirably, the at least one tilt actuator extends between the intermediate frame and one of the feeder and header mounting frame. Alternatively, the lateral tilt actuator extends between the feeder and the header mounting frame.

Desirably, the at least one lateral tilt actuator and/or the two fore-aft actuators are formed by hydraulic cylinders.

BRIEF DESCRIPTION OF THE DRAWINGS

For the purpose of illustration, there are shown in the drawings certain embodiments of the present invention. In the drawings, like numerals indicate like elements throughout. It should be understood, however, that the invention is not limited to the precise arrangements, dimensions, and instruments shown. In the drawings.

DETAILED DESCRIPTION OF THE INVENTION

Figure 1:
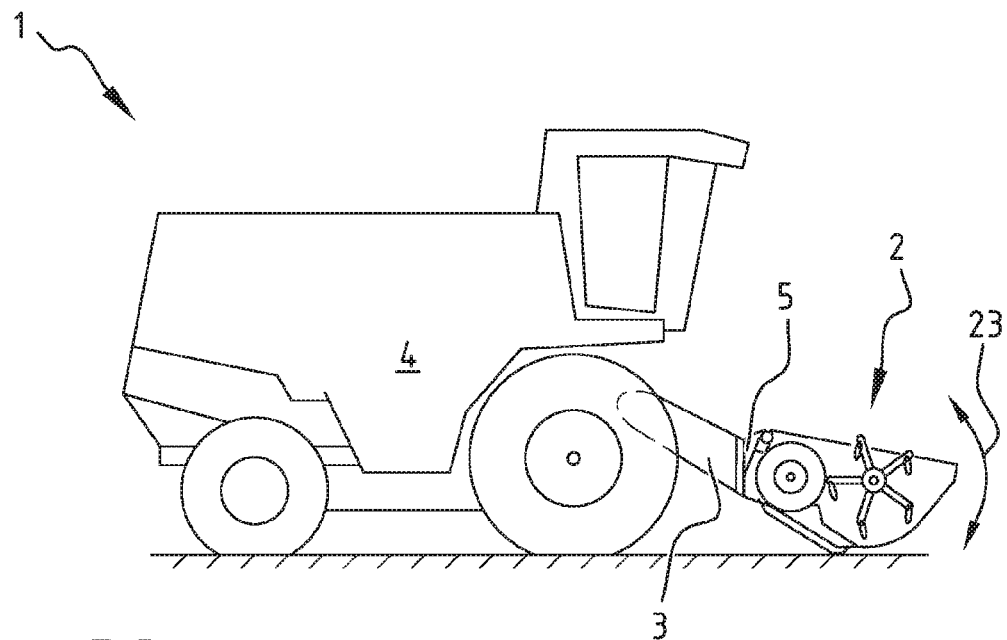
FIG. 1 shows a side view of an agricultural harvester comprising a header and a header mounting frame, the header mounted to the header mounting frame, in accordance with an exemplary embodiment of the present invention.

FIG. 1 shows a side view of an agricultural harvester (or vehicle) 1, in accordance with an exemplary embodiment of the present invention. In operation, a header 2 is connected to the agricultural harvester 1. The agricultural harvester 1 comprises a feeder 3 which is connected to the header 2 via a header mounting frame 5 provided at the frontal end of the feeder 3, and is provided for taking in harvested crop material from the header 2 towards the body 4 of the agricultural harvester 1. The header 2 has to be positioned in a fore-aft position with respect to the agricultural vehicle 1. Thereby the fore-aft position defines the angle between the cutting knives of the header and the ground surface. Tests have shown that an ideal fore-aft position depends on the type of crop material to be harvested. Therefore, the fore-aft position is desirably adaptable. This is implemented by allowing the header mounting frame 5 to perform a fore-aft movement, which is indicated in FIG. 1 with reference number 23. A fore-aft movement is defined as a movement of the header mounting frame 5 with respect to the feeder 3 around an axis which is substantially horizontal and transverse to the forward driving direction of the agricultural vehicle 1. In an exemplary embodiment of the present invention, the load on the wheels of the agricultural vehicle 1 is determined, which load may vary by loading/unloading crop material from the agricultural harvester 1, and a fore-aft compensation movement is automated to obtain the optimal fore-aft position in multiple different states of the agricultural harvester 1.

Figure 2:
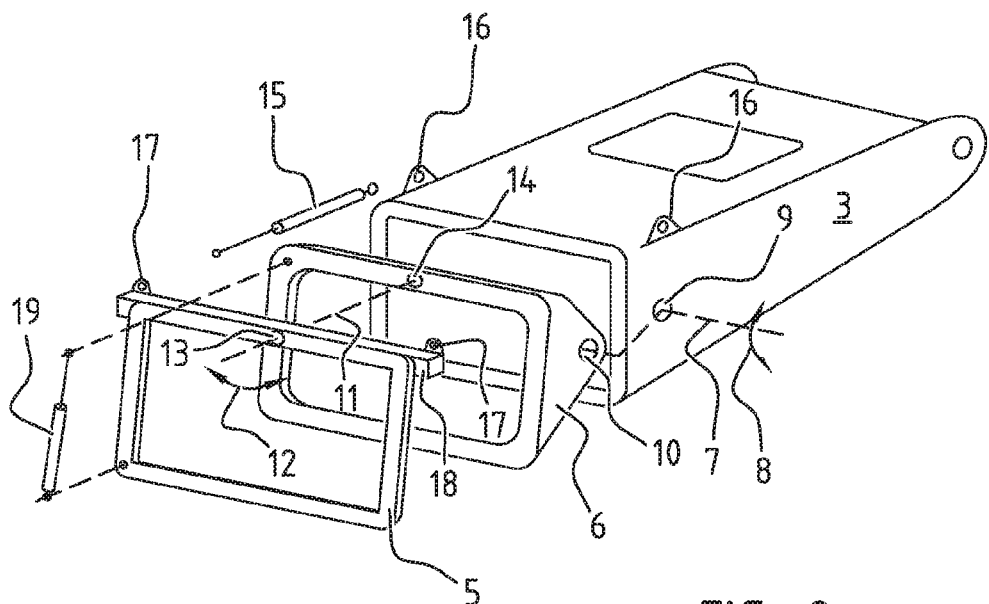
FIG. 2 shows an exploded view of a feeder, an intermediate frame, and the header of FIG. 1, in accordance with an exemplary embodiment of the present invention.
Figure 4:
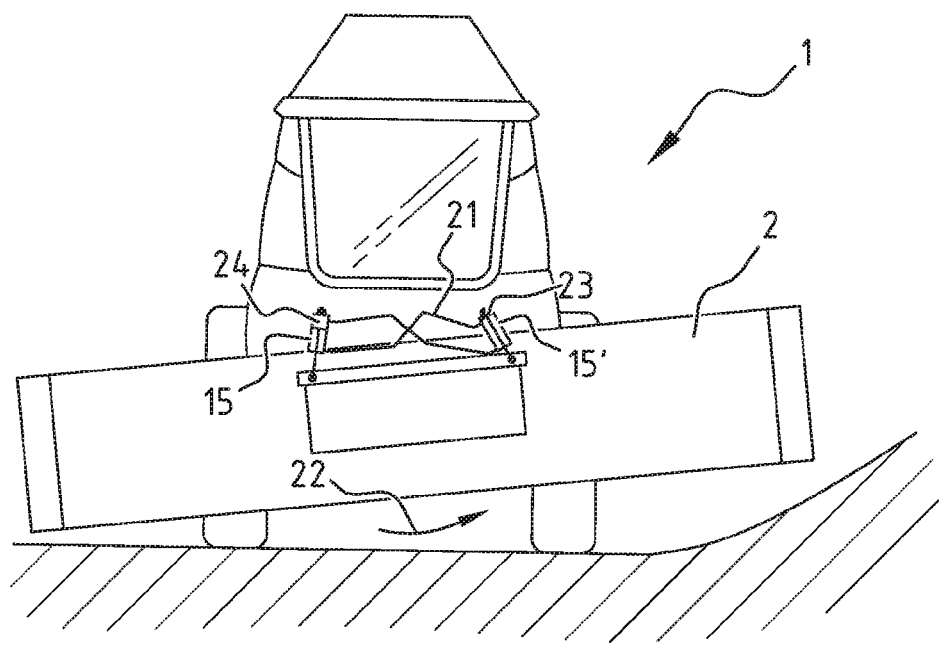
FIG. 4 shows a front view of an agricultural harvester comprising a header that is illustrated as being tilted laterally, in accordance with an exemplary embodiment of the present invention.

FIG. 2 shows an exploded view of the feeder 3 and the header mounting frame 5, and shows the connecting elements to connect the feeder 3 with header mounting frame 5 to allow both a fore-aft movement and a lateral tilt movement, in accordance with an exemplary embodiment of the present invention. The lateral tilt movement and the effect thereof is illustrated in FIG. 4. FIG. 4 shows a front view of an agricultural vehicle 1, and illustrates that an agricultural vehicle 1 with a header 2 having a width that is substantially larger than the width of the agricultural vehicle 1 is desirably able to tilt the header 2 in a lateral tilt to be able to cope with an uneven ground surface. In the example of FIG. 4, the right-hand side of the figure shows a ground surface that is higher than the ground surface on which the agricultural vehicle is standing and shows how the header 2 is laterally tilted in direction 22 so that the distance between the underside of the header 2 and the ground surface is substantially equal at a right-hand side compared to a left-hand side of the header 2.

To be able to allow both a fore-aft movement 23 and a lateral tilt movement 22 of the header mounting frame 5 with respect to the feeder 3, the header mounting frame 5 is mounted to the feeder 3 via an intermediate frame 6. Thereby, different movements can be allowed between the feeder 3 and the intermediate frame 6 than between the intermediate frame 6 and the header mounting frame 5, so that the fore-aft movement and the lateral tilt movement can be embodied. In the example of FIG. 2, the feeder 3 is connected to the intermediate frame 6 for example by placing a shaft (not shown) through an opening 9 at the feeder 3 and through an opening 10 at the intermediate frame 6 so that the intermediate frame 6 can rotate with respect to the feeder 3 around the axis 7. In the example of FIG. 2, the axis 7 is substantially horizontal and transverse to the forward driving direction of the agricultural vehicle 1, so that rotation around the axis 7 directly results in a fore-aft movement of the header mounting frame 5. Rotation around the axis 7 is illustrated in the figure by reference number 8.

Intermediate frame 6 is connected to the header mounting frame 5, for example via a shaft (not shown) extending through an opening 13 of the header mounting frame 5 and an opening 14 of the intermediate frame 6 and allowing the header mounting frame 5 to rotate around an axis 11 with respect to the intermediate frame 6. Thereby, the axis 11 is substantially horizontal and parallel to the forward driving direction of the agricultural vehicle 1, so that a rotation around the axis 11 directly results in a lateral tilt movement of the header mounting frame 5. Rotation around the axis 11 is illustrated in the figure with reference number 12.

Although in FIG. 2 the connection between feeder 3 and intermediate frame 6 embodies the fore-aft movement while the connection between the intermediate frame 6 and the header mounting frame 5 embodies the lateral tilt movement, it will be clear to the skilled person this is a mere design choice, and that other design choices can be made without deviating from the invention. For example, the lateral tilt movement 12 can be embodied between the feeder 3 and the intermediate frame 6 while the fore-aft movement can be embodied between the intermediate frame 6 and the header mounting frame 5. According to yet another embodiment, the rotation axes 7 and 11 can theoretically be positioned anywhere in a substantially horizontal plane, with an angle between each other in such a manner that a combination of rotation around the axes 7 and 11 results in a fore-aft movement and/or a lateral tilt movement of the header mounting frame 5. In this context, it will also be clear that, in the example shown in FIG. 2, a fore-aft movement around the axis 7 results in an angular change of the axis 11 with respect to the horizontal plane. In all positions, the axis 11 is considered substantially horizontal. Therefore, substantially horizontal is defined in the context of the present description as having a maximum angle with respect to a horizontal plane of 20°, desirably maximum 15°, more desirably maximum 10°.

Two fore-aft actuators 15 (only one is shown in FIG. 2) extend between the feeder 3 and the header mounting frame 5. Particularly the feeder 3 comprises a first set of mounting positions 16, and the header 5 comprises a second set of mounting positions 17, and the two fore-aft cylinders 15 are connected to the mounting positions 16 and 17. Thereby, the two fore-aft actuators 15 are desirably hydraulic cylinders. The two fore-aft cylinders 15 are horizontally spaced, meaning that there is a horizontal distance between the two fore-aft actuators 15. Thereby, desirably a first fore-aft actuator 15 is mounted to a first lateral end of the header mounting frame 5, while a second fore-aft actuator 15 is mounted to an opposite, second lateral end of the header mounting frame 5. Tests have shown that the two fore-aft actuators 15, when they extend between the feeder 3 and the header mounting frame 5, are able to carry a significant portion of the load that is in a conventional set-up exerted on the connection points 13, 14, 9, 10. Therefore, as a result, the load of the connection points 13, 14 and 9, 10 is significantly reduced. This reduction is further a result of a lying support beam 18, which extends over the width of the header mounting frame 5, and which carries the second mounting points 17.

Different set-ups are possible to allow the two fore-aft actuators 15 to further reduce the load on the connecting points 13, 14, 9, 10. Particularly, tests and calculations have shown that the relative position of the first mounting points 16 and the second mounting points 17 compared to the position of the lying support beam 18 and to the axes 11 and 7 determine how forces are distributed. This can be calculated and simulated by a skilled person, and is therefore not explained in further detail.

Figure 3:
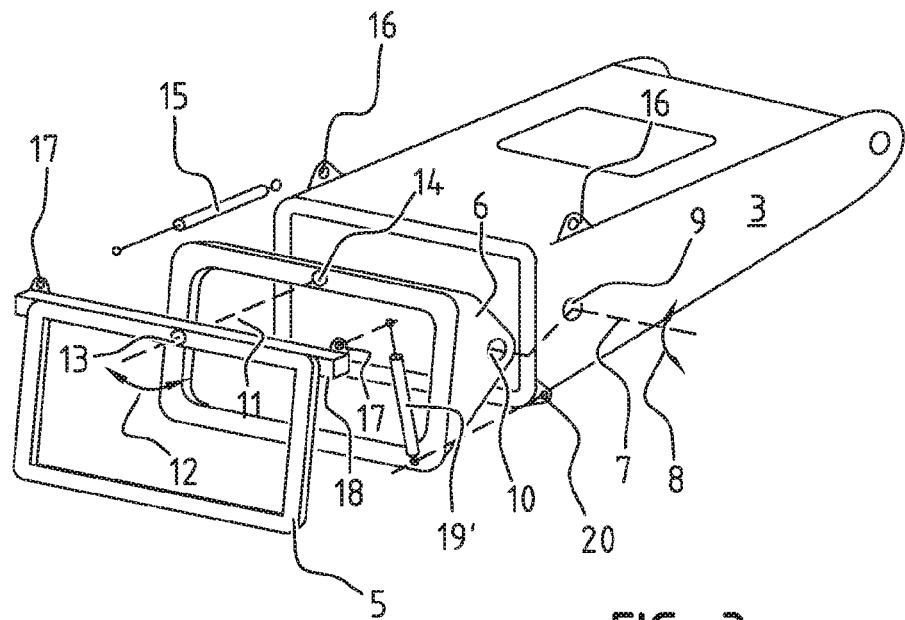
FIG. 3 shows an exploded view of a configuration of a feeder, an intermediate frame, and the header of FIG. 1, in accordance with another exemplary embodiment of the present invention.

At least one lateral tilt actuator 19 is provided between the header mounting frame 5 and the intermediate frame 6. This lateral tilt actuator 19 can be positioned in multiple ways to actuate a rotation 12 around the axis 11. Thereby, FIG. 2 shows a first possible position of the lateral tilt actuator 19, while FIG. 3 shows an alternative position of the lateral tilt actuator 19'. In FIG. 2, the lateral tilt actuator 19 is desirably only a single lateral tilt actuator extending between the intermediate frame 6 and the header mounting frame 5. In FIG. 3, two lateral tilt actuators 19' (only one is shown in the figure, the other one is symmetrically placed at the other lateral end of the feeder) are provided at a horizontal distance from one another and have similar effects and advantages than the two fore-aft actuators 15. Thereby, each lateral tilt actuator 19' extends between a corresponding one of a third set of mounting position 20 at the feeder 3, and a corresponding one of the second set of mounting positions 17 at the header mounting frame 5. By mounting the lateral tilt actuators 19' according to the same concept of the fore-aft actuators 15, similar advantages are obtained, namely a stronger connection between feeder 3 and header mounting frame 5, while reducing the loads on the connecting points 13, 14, 9, 10.

FIG. 4 shows fore-aft actuators 15 and 15' being mounted between the feeder 3 and the header mounting frame 5, wherein the header mounting frame 5 carries a header 2. The figure illustrates how the fore-aft actuators 15 and 15' are cross-coupled. A cross-coupling of actuators is defined as a coupling that has as a result that extension of one of the actuators results in a retraction of the other of the actuators and vice versa. The figure shows that a lateral tilt movement of the header 2 in direction 22 results in a retraction of fore-aft actuator 15', see reference number 23, while the fore-aft actuator 15 extends, see reference number 24. This has as an effect that the fore-aft actuators 15 and 15' can be mounted to extend somewhat upward towards the feeder, thereby being able to bear at least a part of the load of the header 2, while still allowing the lateral tilt movement 22. To allow this cooperation of the fore-aft actuators 15 and 15' in end positions of the fore-aft movement, the actuators 15 and 15' are desirably over-dimensioned. This means that in a most forward position of the header 2 in the fore-aft movement, the actuators 15 and 15' still have some, desirably at least 10% of the actuating movement available. The same for the most rearward position in the fore-aft movement, the actuators 15 and 15' also desirably have 10% of their actuating range available.

These and other advantages of the present invention will be apparent to those skilled in the art from the foregoing specification. Accordingly, it is to be recognized by those skilled in the art that changes or modifications may be made to the above-described embodiments without departing from the broad inventive concepts of the invention. It is to be understood that this invention is not limited to the particular embodiments described herein, but is intended to include all changes and modifications that are within the scope and spirit of the invention.

What is claimed is:

1. An agricultural harvester comprising:
   a feeder;
   an intermediate frame pivotally mounted to the feeder to facilitate pivoting relative to the feeder around a first axis of motion;
   a header mounting frame pivotally mounted to the intermediate frame to facilitate pivoting relative to the intermediate frame around a second axis of motion, wherein the pivoting around the first axis of motion and the second axis of motion allows the header mounting frame to be moved with respect to the feeder in a fore-aft movement and a lateral tilt movement;
   at least one lateral tilt actuator configured for actuating the header mounting frame in order to perform the lateral tilt movement; and
   at least two fore-aft actuators, each extending between a corresponding one of a first set of mounting positions at the feeder and a corresponding one of a second set of mounting positions at the header mounting frame, the at least two fore-aft actuators positioned to actuate and to provide support for said header mounting frame in order to perform the fore-aft movement.

2. The agricultural harvester of claim 1, wherein the at least two fore-aft actuators are cross-coupled such that, in a predetermined fore-aft position of the at least two fore-aft actuators, a retraction of one of the at least two fore-aft actuators results in an extension of the other of the at least two fore-aft actuators and vice versa.

3. The agricultural harvester of claim 2, wherein the at least two fore-aft actuators are dimensioned to each have an operating range that is at least 10% larger than an acting range required to enable a maximum fore-aft movement when the at least one lateral tilt actuator is in a predetermined neutral position.

4. The agricultural harvester of claim 3, wherein the at least two fore-aft actuators are arranged in such a manner that the acting ranges are substantially in a middle of the operating ranges of the at least two fore-aft actuators.

5. The agricultural harvester of claim 1, wherein the first axis of motion and the second axis of motion extend substantially horizontally with an angle of about 90 degrees between them.

6. The agricultural harvester of claim 1, wherein the fore-aft movement of the header mounting frame is defined as a movement of the header mounting frame with respect to the feeder about the first axis which is substantially horizontal and transverse to a forward driving direction of the agricultural harvester.

7. The agricultural harvester of claim 1, wherein the lateral tilt movement of the header mounting frame is defined as a movement of the header mounting frame with respect to the feeder about the second axis which is substantially horizontal and parallel to a forward driving direction of the agricultural harvester.

8. The agricultural harvester of claim 1, wherein the header mounting frame comprises a lying support beam comprising the second set of mounting positions.

9. The agricultural harvester of claim 8, wherein the lying support beam is located at an upper side of the header mounting frame and wherein the first set of mounting positions is located higher than the second set of mounting positions such that the at least two fore-aft actuators carry at least a part of the weight of the header mounting frame.

10. The agricultural harvester of claim 8, wherein the lying support beam is located at a lower side of the header mounting frame and wherein the first set of mounting positions is located lower than the second set of mounting positions such that the at least two fore-aft actuators carry at least a part of the weight of the header mounting frame.

11. The agricultural harvester of claim 1, wherein the at least one lateral tilt actuator extends between the intermediate frame and one of the feeder and the header mounting frame.

12. The agricultural harvester of claim 1, wherein the at least one lateral tilt actuator and the at least two fore-aft actuators are formed by hydraulic cylinders.

13. The agricultural harvester of claim 1, wherein the at least one lateral tilt actuator extends between the feeder and the header mounting frame.

* * * * *